United States Patent
Tishbi et al.

(10) Patent No.: US 12,353,457 B2
(45) Date of Patent: Jul. 8, 2025

(54) SYSTEM AND METHOD FOR TRAINING A MULTI-TENANT LANGUAGE MODEL

(71) Applicant: Avalor Technologies, Ltd., Ramat Gan (IL)

(72) Inventors: Kfir Aharon Tishbi, Herzliya (IL); Raanan Raz, Tel Aviv (IL); Amir Sheffer, Tel Aviv (IL)

(73) Assignees: Avalor Technologies, Ltd., Tel Aviv (IL); Zscaler, Inc., San Jose, CA (US)

( * ) Notice: Subject to any disclaimer, the term of this patent is extended or adjusted under 35 U.S.C. 154(b) by 272 days.

(21) Appl. No.: 18/339,846

(22) Filed: Jun. 22, 2023

(65) Prior Publication Data

US 2024/0427810 A1   Dec. 26, 2024

(51) Int. Cl.
*G06F 16/334* (2025.01)
*G06F 16/34* (2025.01)
*G06F 16/901* (2019.01)
*G06F 40/284* (2020.01)

(52) U.S. Cl.
CPC .......... *G06F 16/3344* (2019.01); *G06F 16/34* (2019.01); *G06F 40/284* (2020.01); *G06F 16/9024* (2019.01)

(58) Field of Classification Search
CPC .... G06F 40/284; G06F 16/34; G06F 16/3344; G06F 16/9024
See application file for complete search history.

(56) References Cited

U.S. PATENT DOCUMENTS

| | | | |
|---|---|---|---|
| 10,395,271 B2 | 8/2019 | Kassko et al. | |
| 10,754,877 B2 | 8/2020 | Kassko et al. | |
| 11,783,515 B2 | 10/2023 | Sheffer et al. | |
| 2020/0259728 A1 | 8/2020 | Oren et al. | |
| 2023/0274086 A1* | 8/2023 | Tunstall-Pedoe | G06F 40/20 704/9 |
| 2024/0289558 A1* | 8/2024 | Muraoka | G06F 40/30 |
| 2024/0370769 A1* | 11/2024 | Sheth | G06N 20/00 |
| 2024/0394285 A1* | 11/2024 | Cunningham | H04L 51/02 |
| 2024/0412226 A1* | 12/2024 | Mathur | G06F 9/453 |
| 2024/0427810 A1* | 12/2024 | Tishbi | G06F 40/284 |

* cited by examiner

*Primary Examiner* — Samuel G Neway
(74) *Attorney, Agent, or Firm* — Baratta Law PLLC; Lawrence A. Baratta, Jr.

(57) ABSTRACT

A system and method are disclosed for reducing false responses from a large language model. The method includes: mapping a data field from a first source to a semantic layer, the semantic layer including a plurality of data fields; storing data from the first source in a database based on the semantic layer; tokenizing each data field for a first large language model (LLM); fine-tuning the first LLM based on the tokenized semantic layer; providing a prompt to the first LLM, which configures it to generate an output answer; providing the output answer to a second LLM, which configures it to generate a query for the database; executing the query on the database to generate a database output based on the stored data; and providing the output answer in a user interface (UI) in response to determining that the database output and the output answer are within a predefined threshold.

27 Claims, 8 Drawing Sheets

SYSTEM AND METHOD FOR TRAINING A MULTI-TENANT LANGUAGE MODEL

TECHNICAL FIELD

The present disclosure relates generally to large language models (LLMs), and specifically to removing false answers from LLM outputs.

BACKGROUND

Large language models (LLMs) have seen a recent rise in utilization, due in part to providing various application program interface (API) access to the general public, and utilization of models such as Google®'s BARD or PaLM, and OpenAI's ChatGPT®.

These solutions are based on a broader class of artificial intelligence technologies known as generators, or generative AI. ChatGPT, for example, references a generative pre-trained transformer (GPT), which is an artificial neural network pre-trained on large data sets of unlabeled text.

LLMs receive a prompt, which can be phrased as a natural language query, and these prompts are tokenized into an input which the LLM can process in order to generate an output.

One problem that arises when utilizing such generative models has been labeled as the danger of stochastic parrot. In other words, a transformer may generate an output that looks like a right answer, or what a right answer might be, and yet be devoid of any context, not be based on training data, and the like.

When paired with another phenomena called hallucinations, this undermines the confidence of any answer received from such a model. Not to be confused with data bias, which can also affect the perception of confidence of an answer received in response to a computer query, a hallucination is a circumstance where an LLM essentially generates an answer which looks to be correct, but is not based on any fact or training data.

This presents a challenge, as on the one hand it is extremely convenient to be able to converse with a computer system using natural language, and receive responses in a natural language, while on the other, if such answers lack confidence from human users, these LLMs will not be used for long, as information must be reliable to be useful.

For example, in cybersecurity applications, receiving a false answer to a query can have serious undesirable consequences, such as cessation of service providing, or wasting resources to try and find a cybersecurity breach which does not exist. For example, if a cybersecurity monitoring solution provides a false answer, in response to a query for detecting if a resource is compromised by a cybersecurity threat, this can result in suspension of the resource, service shutdown, and wasting manpower to determine where a threat is, which does not exist.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include mapping a data field from a first source to a data field of a predefined semantic layer, the predefined semantic layer including a plurality of data fields. The method may also include storing data from the first source in a database based on the predefined semantic layer. The method may furthermore include tokenizing each data field of the plurality of data fields for a first large language model (LLM). The method may in addition include fine-tuning the first LLM based on the tokenized predefined semantic layer. The method may moreover include providing a prompt to the first LLM, which configures the first LLM to generate an output answer. The method may also include providing the output answer to a second LLM, which configures the second LLM to generate a query for the database. The method may furthermore include executing the query on the database to generate a database output based on the stored data. The method may in addition include providing the output answer in an user interface (UI) in response to determining that the database output and the output answer are within a predefined threshold. The method may moreover include fine-tuning the first LLM further, in response to determining that the database output and the output answer are not within the predefined threshold. Other embodiments of this aspect include corresponding computer systems, apparatus, and computer programs recorded on one or more computer storage devices, each configured to perform the actions of the methods.

Implementations may include one or more of the following features. The method may include: fine-tuning the second LLM based on the semantic layer and a plurality of queries, each query of the plurality of queries including a data field of the plurality of data fields. The method may include: receiving data of a first computing environment associated with a first tenant from the first source; receiving data of a second computing environment associated with a second tenant; generating a representation of the first computing environment in a representation graph stored on a graph database, based on the received data and the semantic layer; generating a representation in the representation graph of the second computing environment; receiving a prompt, the prompt including an identifier of a computing environment; generating a tokenized input based on the prompt; providing the tokenized input to the first LLM, the first LLM further fine-tuned on the representation graph; and generating the output answer based on the tokenized input and the identifier of the computing environment. The method may include: detecting a sensitive data in the prompt, the sensitive data having a classification; and generating a new prompt based on the received prompt, where the new prompt includes an anonymized data in place of the sensitive data, the anonymized data generated based on the classification.

The method may include: generating the tokenized input based on the new prompt. In some embodiments, the second LLM is the first LLM. The method may include: generating a tokenized input based on the prompt; and configuring the first LLM to process the tokenized input. The method may include: generating a second prompt for the second LLM, where the second prompt includes a request to generate a query for the database based on the output answer. The method may include: tokenizing the second prompt; and configuring the second LLM to process the tokenized second prompt. The method may include: providing the output answer further based on a credibility score, where the first source is associated with an authority score. The method where a second source is associated with a second authority score, and the credibility score is generated based on the authority score and the second authority score. The method may include: generating an uber node in the semantic layer, the uber node including: a data value from a first data field of the first source, and a second data value from a second data field of a second source. In some embodiments the second source is a cybersecurity monitoring solution configured to monitor a computing environment with which the first source interacts. Implementations of the described techniques may include hardware, a method or process, or a computer tangible medium.

In one general aspect, a non-transitory computer-readable medium may include one or more instructions that, when executed by one or more processors of a device, cause the device to: map a data field from a first source to a data field of a predefined semantic layer, the predefined semantic layer including a plurality of data fields; store data from the first source in a database based on the predefined semantic layer; tokenize each data field of the plurality of data fields for a first large language model (LLM); fine-tune the first LLM based on the tokenized predefined semantic layer; provide a prompt to the first LLM, which configures the first LLM to generate an output answer; provide the output answer to a second LLM, which configures the second LLM to generate a query for the database; execute the query on the database to generate a database output based on the stored data; provide the output answer in an user interface (UI) in response to determining that the database output and the output answer are within a predefined threshold; and fine-tune the first LLM further, in response to determining that the database output and the output answer are not within the predefined threshold. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: map a data field from a first source to a data field of a predefined semantic layer, the predefined semantic layer including a plurality of data fields. The system may in addition include store data from the first source in a database based on the predefined semantic layer. The system may moreover include tokenize each data field of the plurality of data fields for a first large language model (LLM). The system may also include fine-tune the first LLM based on the tokenized predefined semantic layer. The system may furthermore include provide a prompt to the first LLM, which configures the first LLM to generate an output answer. The system may in addition include provide the output answer to a second LLM, which configures the second LLM to generate a query for the database. The system may moreover include execute the query on the database to generate a database output based on the stored data. The system may also include provide the output answer in an user interface (UI) in response to determining that the database output and the output answer are within a predefined threshold. The system may furthermore include fine-tune the first LLM further, in response to determining that the database output and the output answer are not within the predefined threshold. Other embodiments of this aspect include corresponding computer systems, apparatus, and computer programs recorded on one or more computer storage devices, each configured to perform the actions of the methods.

Implementations may include one or more of the following features. A system where the memory contains further instructions which when executed by the processing circuitry further configure the system to: fine-tune the second LLM based on the semantic layer and a plurality of queries, each query of the plurality of queries including a data field of the plurality of data field. The system where the memory contains further instructions which when executed by the processing circuitry further configure the system to: receive data of a first computing environment associated with a first tenant from the first source; receive data of a second computing environment associated with a second tenant; generate a representation of the first computing environment in a representation graph stored on a graph database, based on the received data and the semantic layer; generate a representation in the representation graph of the second computing environment; receive a prompt, the prompt including an identifier of a computing environment; generate a tokenized input based on the prompt; provide the tokenized input to the first LLM, the first LLM further fine-tuned on the representation graph; and generate the output answer based on the tokenized input and the identifier of the computing environment. The system where the memory contains further instructions which when executed by the processing circuitry further configure the system to: detect a sensitive data in the prompt, the sensitive data having a classification; and generate a new prompt based on the received prompt, where the new prompt includes an anonymized data in place of the sensitive data, the anonymized data generated based on the classification. The system where the memory contains further instructions which when executed by the processing circuitry further configure the system to: generate the tokenized input based on the new prompt. The system where the second LLM is the first LLM. The system where the memory contains further instructions which when executed by the processing circuitry further configure the system to: generate a tokenized input based on the prompt; and configure the first LLM to process the tokenized input. The system where the memory contains further instructions which when executed by the processing circuitry further configure the system to: generate a second prompt for the second LLM, where the second prompt includes a request to generate a query for the database based on the output answer. The system where the memory contains further instructions which when executed by the processing circuitry further configure the system to: tokenize the second prompt; and configure the second LLM to process the tokenized second prompt. The system where the memory contains further instructions which when executed by the processing circuitry further configure the system to: provide the output answer further based on a credibility score, where the first source is associated with an authority score. The system where a second source is associated with a second authority score, and the credibility score is generated based on the authority score and the second authority score. The system where the memory contains further instructions which when executed by the processing circuitry further configure the system to: generate an uber node in the semantic layer, the uber node including: a data value from a first data field of the first source, and a second data value from a second data field of a second source. The system where the second source is a cybersecurity monitor solution configured to monitor a computing environment with which the first source interact. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
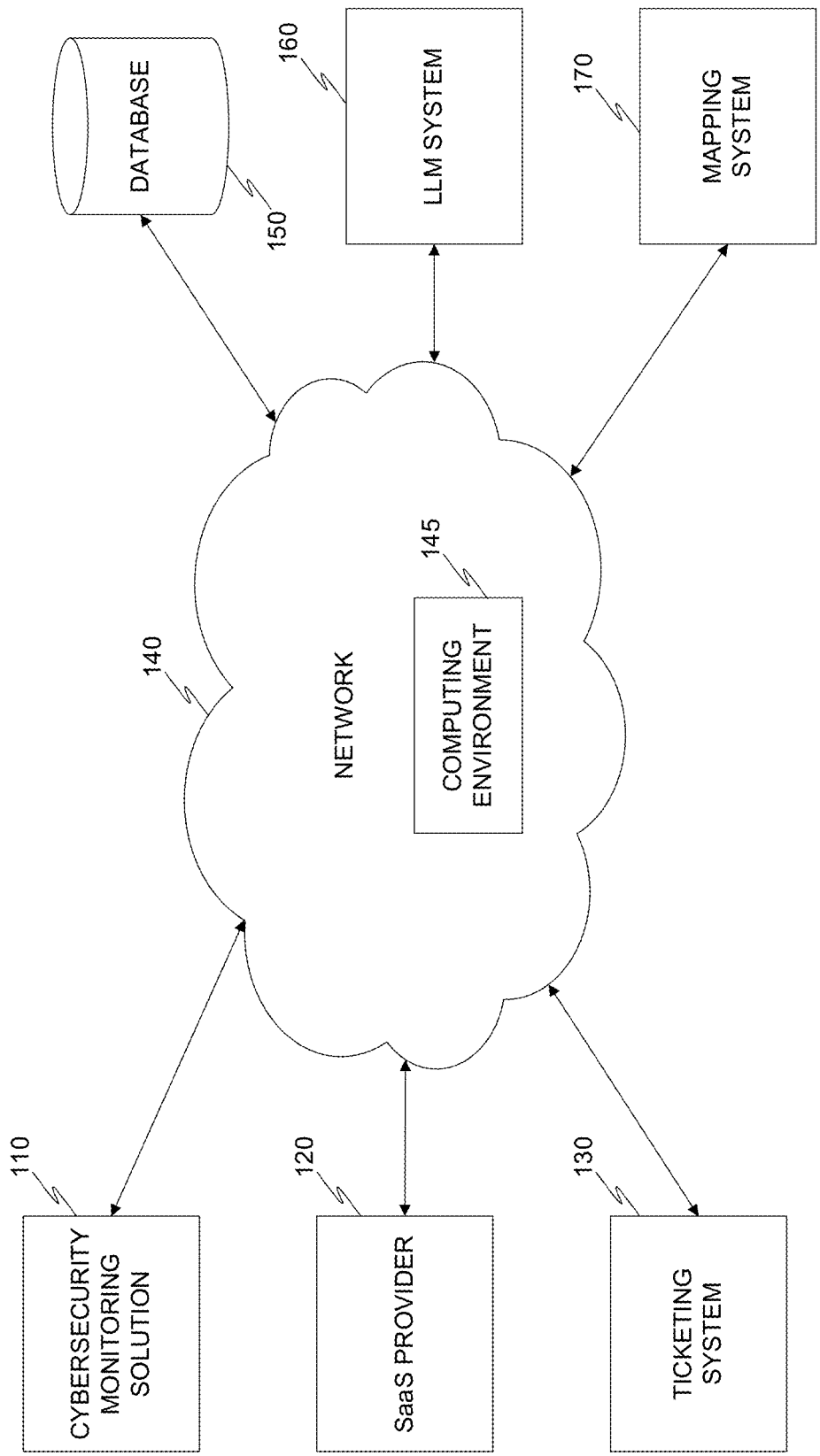
FIG. 1 is an example network diagram of a computing environment utilizing a large language model system, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for reducing false answers from large language models of cybersecurity solutions is disclosed. According to an embodiment, an LLM is trained on a semantic layer generated on top of multiple data sources, which each describe the same computing environment. In an embodiment, the semantic layer includes a representation of the computing environment, for example utilizing a shared data model. In a shared data model, each entity of the computing environment is described by a data record generated based on predefined data schema, and stored, for example, as a node in a representation graph of a graph database.

According to some embodiments, uber nodes are generated based on receiving data from multiple data sources related to a single entity in the computing environment, and storing the received data thereon using the shared data model. This is advantageous as it allows to have a single source of truth which describes a computing environment. Furthermore, by training a large language model on a data structure which includes the uber nodes (e.g., the semantic layer), tokenization is decreased since only the semantic layer data fields need to be tokenized, in place of tokenizing each data field of each data source.

On advantage of the present disclosure is providing a method and system which include a check and balance for an answer received as an output from an LLM which is trained for a cybersecurity solution. For example, by fine-tuning a pretrained LLM to generate answers based on a semantic data layer, token usage is reduced, thereby decreasing resources required to train and process the neural network of the LLM. Furthermore, by then generating a database query based on an output received from the LLM, such an output can be verified with the appropriate data source, thereby reducing the probability of receiving a false answer from the LLM. In some embodiments, the database query is generated by the LLM, for example by providing the output of the LLM as an input prompt, modifying the output of the LLM based on a query prompt which instructs the LLM to generate a query output, a combination thereof, and the like.

FIG. 1 is an example network diagram of a computing environment utilizing a large language model system, utilized to describe an embodiment. In an embodiment, a computing environment 145 utilizes a network 140, which provides connectivity for various components, resources, and the like. In some embodiment, the network 140 includes a wireless network, cellular network, wired network, a local area network (LAN), a wide area network (WAN), a metro area network (MAN), the Internet, the worldwide web (WWW), similar networks, and any combination thereof.

According to an embodiment, the computing environment 145 is a networked computing environment, a cloud computing environment, an on-premises computing environment, a hybrid environment, a combination thereof, and the like. For example, in an embodiment, a cloud computing environment is a virtual private cloud (VPC), a virtual network (VNet), and the like. In an embodiment, the cloud computing environment is deployed on a cloud computing infrastructure, such as Amazon® Web Service (AWS), Microsoft® Azure, Google® Cloud Platform (GCP), and the like.

In an embodiment, a computing environment 145 is monitored by a cybersecurity monitoring solution 110. For example, a cybersecurity monitoring solution 110 is configured, according to an embodiment, to access a computing environment 145 and detect cybersecurity objects. In some embodiments, a cybersecurity monitoring solution 110 is configured to monitor a command line interface (CLI), an infrastructure as code (IaC) system, a production environment, a staging environment, combinations thereof, and the like.

In some embodiments, the computing environment 145 receives a service, access to a service, access to a software solution, and the like, from a software as a service (SaaS) provider 120. In an embodiment, a SaaS provider 120 is, for example, Microsoft® Office365®, a storage service such as Amazon® S3, an enterprise resource planning (ERP) software solution (e.g., Oracle® Netsuite, SAP® ERP, etc.), customer relationship management (CRM) software, and the like.

In certain embodiments, the computing environment 145 includes, or has access to, a ticketing system 130. In an embodiment, the ticketing system 130 is configured to generate a ticket (stored, for example, as a data record), based on an alert generated by a cybersecurity monitoring solution 110. In some embodiments, the ticketing system 130 is configured to assign a ticket to a principal of the computing environment 145. For example, according to an embodiment, a principal is a user account, service account, role, user group, a combination thereof, and the like. A ticketing system 130 is, for example, Zendesk®, ServiceNow®, Jira®, and the like.

Each of the cybersecurity monitoring solution 110, the SaaS provider 120, the ticketing system 130, and the like, are data sources which provide information about the computing environment 145. Each of the data sources, by interacting with the computing environment 145, stores some representation of the computing environment 145.

For example, according to an embodiment, a cybersecurity monitoring solution 110 includes a representation of the number, type, etc. of resources and principals deployed in the computing environment 145, and what, if any, cybersecurity threats are present thereon. As another example, a SaaS provider 120 is configured to provide storage service with access to various user accounts, for example based on a role associated with a user account. The SaaS provider 120 therefore has a representation of principals of the computing environment 145, which is utilized by the SaaS provider 120 to determine which user account of the computing environment 145 is authorized to access a particular storage address on a cloud-based storage.

In certain embodiments, the computing environment 145 is further connected to a large language model (LLM) system 160. In some embodiments, the LLM system 160 is deployed in a computing environment of a mapping system 170, which further includes a database 150. In an embodiment, the mapping system 170 is configured to detect data fields in data received from data sources of the computing environment 145, and store data, metadata, and the like, on the database 150. In some embodiments, the mapping system 170 is configured to generate a representation of the computing environment 145. In certain embodiments, the representation is generated based on a shared data model, a semantic layer, and the like. For example, according to an embodiment, the mapping system 170 is configured to map a data field from a first data source (e.g., cybersecurity monitoring solution 110) to a data field of a predefined data model of the database 150.

In some embodiments, the database 150 is a graph database, such as Node4j®. For example, in an embodiment, a resource, a principal, a ticket, and the like, are represented as nodes in the database 150. In certain embodiments, a node is generated based on a data schema, and is further stored with data, metadata, a combination thereof, and the like, received from a data source, a plurality of data sources, and the like.

In an embodiment, the LLM system 160 includes an LLM. In some embodiments, the LLM is fine-tuned based on the semantic layer, the shared data model, data from the database 150, a combination thereof, and the like. In an embodiment, the LLM system 160 includes a plurality of LLMs. In some embodiments, a first LLM is fine-tuned on the semantic layer, the shared data model, and the like, and a second LLM is fine-tuned on the sematic layer, the shared data model, and the like, and further trained on queries directed at the database 150.

In some embodiments, the LLM system 160 is configured to generate a user interface (UI) through which an input is received. In certain embodiments, the input is a textual input. In order to process the input, the LLM requires a textual input to undergo tokenization. The larger a language is in terms of unique words, the more processing is required in order to tokenize it, and further, the more storage, memory, and the like, is utilized for such processing.

By mapping data fields of a first data source and a second data source to data fields of a shared data model, semantic layer, and the like, this allows to tokenize only the data fields of the shared data model, semantic layer, and the like. For example, an input prompt is converted by replacing data fields of the data source with data fields of the shared data model, and this reduces the need to tokenize similar data fields from a plurality of different sources. For example, a first data source references user account identifiers as "user_id", a second data source references the same user account identifiers as "userident", while a third data source references the same user account identifiers as "account_id". In some embodiments, "user_id" is tokenized, and the other references are mapped to "user_id", so that when an input includes, for example, "account_id", it is replaced with "user_id", thereby negating the need to tokenize "account_id".

In some embodiments, the LLM system 160 is configured to receive the input prompt and generate an output based on the input prompt. However, a known problem in output generation for LLMs is in hallucinations, which is a term that describes an output which has all the characteristics of a real answer to a user query, but is not based in fact. An example of such a hallucination is shown in more detail in FIG. 7 below.

According to an embodiment, the output from a first LLM is utilized in generating a prompt for a second LLM. In an embodiment, the prompt for the second LLM is based on a template, schema, and the like, such that when the second LLM processes the prompt, the output generated is a database query for execution on a data source, on the database 150, and the like, in order to generate a database output.

In an embodiment, the output generated by the first LLM is compared to the database output, in order to determine if the LLM generated an answer which is a reliable answer. In some embodiments, the data source is associated with an authority score, and the LLM output further includes a reliability score, which is generated based on the authority score of the data source. An example of a database query generation by a second LLM is discussed in more detail below in FIG. 8 with respect to the example of FIG. 7.

Figure 2:
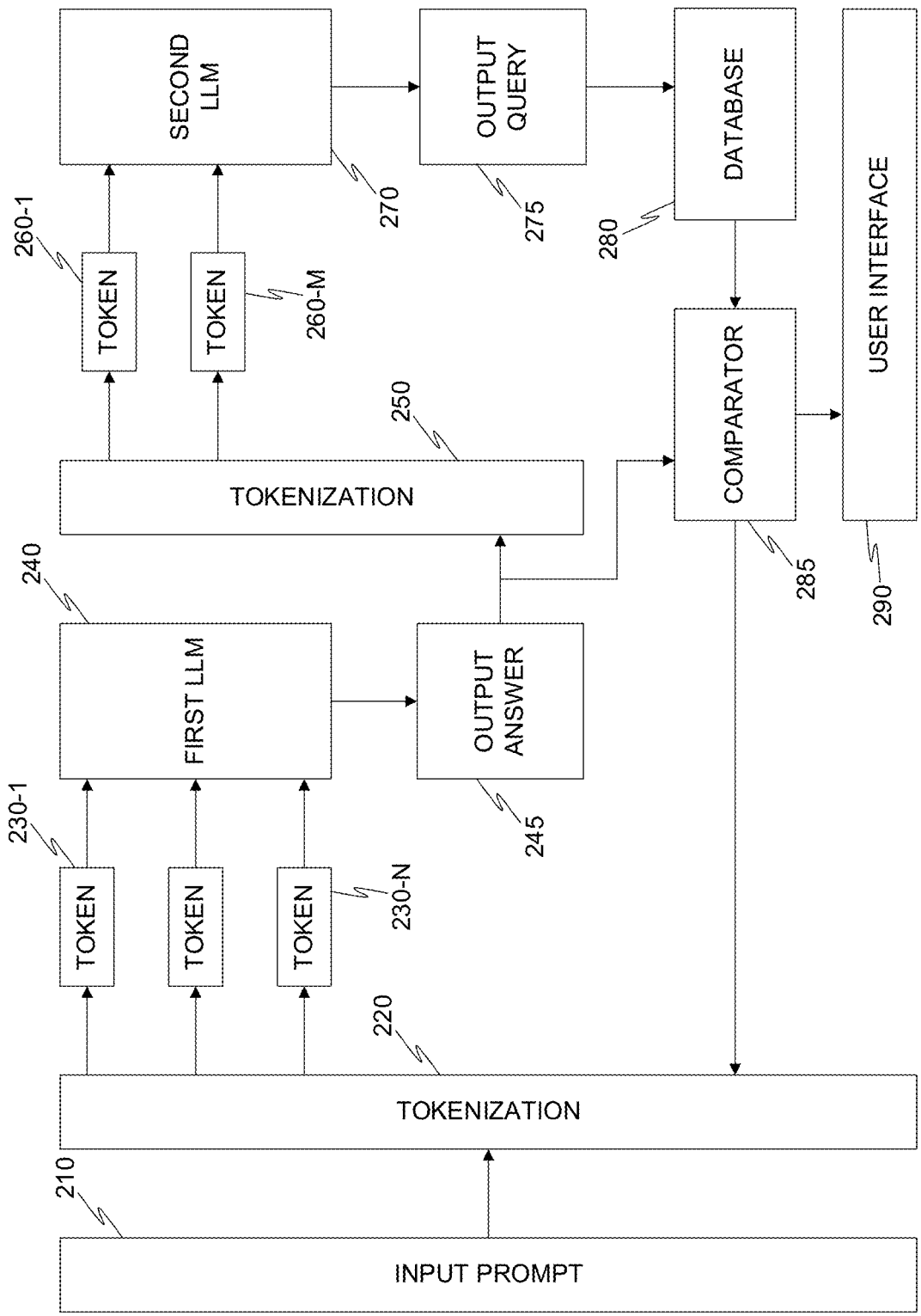
FIG. 2 is an example schematic diagram of an LLM system for reducing false response rate, implemented in accordance with an embodiment.

FIG. 2 is an example schematic diagram of an LLM system for reducing false response rate, implemented in accordance with an embodiment. In some embodiments, the LLM system 160 of FIG. 1 is implemented utilizing an architecture as described in more detail hereinbelow. In certain embodiments, an input prompt 210 is received by an LLM system. In an embodiment, the input prompt 210 is a text-based prompt, provided for example as cleartext, plaintext, a combination thereof, and the like.

In some embodiments, the input prompt 210 includes a sensitive data, such as personal identifiable information (PII), protected health information (PHI), payment card industry (PCI) data, and the like. In certain embodiments, an LLM system is configured to detect sensitive data. In some embodiments, the LLM system is configured to replace a detected sensitive data with another data, for example based on predefined data, predefine data schema, a combination thereof, and the like.

In an embodiment, the input prompt 210 is processed by a tokenization layer 220. In some embodiments, the tokenization layer is implemented as a software component which is configured to receive an input from the input prompt 210 and generate a tokenized input, such as token 230-1 through 230-N, where 'N' is an integer having a value of '2' or greater, individually referenced as token 230 and collectively referenced as tokens 230.

According to an embodiment, it is desirable to have a low number of tokens, as this reduces the amount of processing and memory required to execute the LLM. For example, where account_id and user_id are each tokenized, this requires more token usage than mapping each term to a third term, and only tokenizing the third term. For example, account_id is mapped to user_id, according to an embodiment, and user_id is tokenized. This allows to reduce the number of terms which need to be tokenized, thereby improving the processing (e.g., by reducing the number of terms needed to process) and memory usage for an LLM.

In an embodiment, the tokens 230 are provided to the LLM 240. In some embodiments, the LLM 240 is a pretrained model. For example, in an embodiment, the LLM 240 is pretrained using an autoregressive method. An autoregressive LLM is an LLM which is pretrained to predict a next token in a series of tokens. In some embodiments, the LLM 204 is pretrained using a masked method. A masked method is pretrained to predict a masked (or missing) token between a first token and a second token.

For example, generative pretrained transformers (GPTs) are autoregressive trained models, while bidirectional encoder representations from transformers (BERTs) are masked trained models.

In certain embodiments, the LLM 240 is fine-tuned based on a semantic layer, a shared data model, and the like. In an embodiment, the LLM 240 is fine-tuned based on data fields of the shared data model, the semantic layer, and the like. In an embodiment, fine-tuning includes freezing weights of a plurality of neurons of the LLM 240.

For example, in an embodiment, the LLM 240 includes a plurality of layers, each layer including a plurality of neurons. Each neuron is associated with a weight value. The LLM 240 further includes, according to an embodiment, input layer of neurons and an output layer of neurons. In some embodiments, layers which are closer to the output remain unfrozen (i.e., the weights are changed by training), while weights of layers closer to the input layer are frozen.

In an embodiment, fine-tuning is performed utilizing supervised learning techniques, weak supervised learning techniques, and the like. In certain embodiments reinforcement learning techniques are utilized for fine-tuning. In an embodiment, supervised learning techniques and reinforcement learning techniques are utilized together to fine-tune the LLM 240.

In some embodiments, the LLM 240 is configured to generate an output answer 245. In an embodiment, the output answer 245 is generated based on a probability distribution over a vocabulary of the LLM 240. In an embodiment, the probability distribution is represented as a vector. In certain embodiments, the vector is processed by a softmax function. In an embodiment, the softmax function is utilized as the last action function of a neural network, to normalize an output generated by the LLM 240 over predicted output classes, which are the vocabulary of the LLM 240.

In an embodiment, the output answer 245 is tokenized by a tokenizer 250. In some embodiments, the tokenizer 250 is implemented as the tokenization layer 220, while in other embodiments, the tokenizer 250 and the tokenization layer 220 are different tokenizers. According to an embodiment, the tokenizer 250 is configured to receive the output answer 245 and tokenize the output answer 245 into tokens 260-1 through 260-M, where 'M' is an integer having a value of '2' or greater.

In some embodiments, the tokenizer 250 is further configured to receive an input based on the output answer 245 and a predefined template. For example, in an embodiment, the tokenizer receives the output answer 245, and a prompt, such as "generate a query for database 'x' to detect output answer 245", where 'x' is a database, data source, and the like. For example, in an embodiment, 'x' is the database 150 of FIG. 1 above.

In certain embodiments, the tokens 260 are provided to a second LLM 270. In an embodiment, the second LLM 270 is the first LLM 240. In some embodiments, the second LLM 270 is an LLM which is fine tuned based on a shared data model, a semantic layer, a plurality of data fields, a combination thereof, and the like. In some embodiments, the second LLM 270 is further trained (i.e., fine-tuned) based on a plurality of queries, such as SQL queries, non-SQL queries, structured queries, unstructured queries, combinations thereof, and the like.

Fine tuning the second LLM 270 based on queries allows the second LLM 270 to generate a query based on a received output answer 245. Executing such a query generated by the second LLM 270 is advantageous as it allows to verify the accuracy of the output answer 245 generated by the first LLM 240.

In an embodiment, the second LLM 270 is configured to generate an output query 275. In an embodiment, the output query 275 is generated based on a probability distribution over a vocabulary of the second LLM 270. In an embodiment, the probability distribution is represented as a vector. In certain embodiments, the vector is processed by a softmax function. In an embodiment, the softmax function is utilized as the last action function of a neural network, to normalize an output generated by the second LLM 270 over predicted output classes, which are the vocabulary of the second LLM 270.

In some embodiments, the output query 275 is a structured query which is executed on a database 280. In an embodiment, the database 280 is a graph database, such as the database 150 of FIG. 1 above. In certain embodiments, executing the output query 275 on the database 280 configures the database 280 to generate a result which is provided to a comparator 285.

In an embodiment, the comparator 285 is implemented as a comparator circuit, a software module, a combination thereof, and the like. In some embodiments, the comparator 285 is configured to receive an output answer 245 and a database result. In certain embodiments, the comparator 285 is configured to generate a comparison between the output answer 245 and the database result.

In some embodiments, the comparison is utilized to determine if the output answer 245 matches the database result. This allows to determine if the output answer 245 is a usable result, or if the output answer 245 is a hallucination (i.e., a false result) generated by the LLM 240.

In certain embodiments, the output answer 245 and the database result are determined to match if a value of the output answer 245 and a value of the database result are similar within a predefined threshold, a predetermined threshold, a combination thereof, and the like.

In an embodiment, the comparator 285 is further configured to determine if the output answer 245 is a hallucination (i.e., a false result), or a real result. In certain embodiments, where the comparator is configured to determine that the output answer 245 is a real result (or not a false result), the comparator 285 is further configured to supply the output answer 245 to a user interface (UI) 290.

According to an embodiment, the UI 290 is a graphical user interface (GUI) which includes a text rendered element. In an embodiment, the UI 290 includes instructions which, when executed by a processing circuitry, configured a system of the processing circuitry to render on a display the text rendered element.

In some embodiments, the UI 290 includes an audio output, generated, for example, using a text-to-audio software module. In an embodiment, the UI 290 is configured to provide the output answer 245 utilizing a display, an audio output, a combination thereof, and the like.

Figure 3:
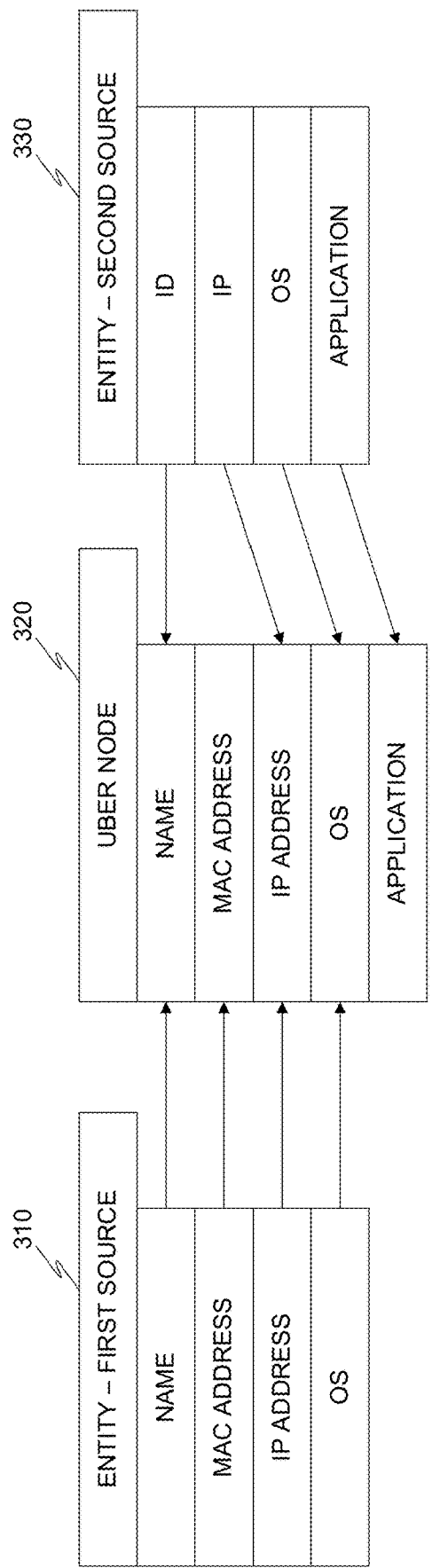
FIG. 3 is an example schematic illustration of an uber node of a representation graph, implemented according to an embodiment.

FIG. 3 is an example schematic illustration of an uber node of a representation graph, implemented according to an embodiment. In an embodiment, a mapper, such as the mapping system 170, is configured to receive data from multiple sources, detect an entity represented by a plurality of sources, and map data fields from each source to a data field of an uber node which represents the entity in a graph data structure.

According to an embodiment, a semantic layer, a shared data model, and the like, include a plurality of uber nodes, each uber node representing an entity of a computing environment.

For example, a first entity 310 is represented by a first data source using a first data schema, and a second entity 330 is represented by a second data source using a second data schema, in an embodiment. In certain embodiments, the first data source is, for example, a SaaS solution provided by Servicenow®, and the second data source is, for example, a SaaS solution provided by Rapid7. Each data source interacts with a compute environment, the resources therein, the principals therein, and the like, in a different manner, using different methods, and store data utilizing different data structures, in accordance with an embodiment.

In an embodiment, the first entity 310 includes a first plurality of data fields, such as 'name', 'MAC address', 'IP address', and 'OS'. In some embodiments, the second entity 330 includes a second plurality of data fields, such as 'ID', 'IP', 'OS', and 'Application'. In certain embodiments, a mapper is configured to detect values of data fields which match the first entity 310 to the second entity 330. In some embodiments, the mapper is further configured to map the data fields of each of the sources to a data field of an uber node 320, which is a representation of an entity based on a plurality of different sources.

For example, in an embodiment the data field 'Name' of the first entity 310, and the data field 'ID' of the second entity 330, are mapped to the data field 'Name' of the uber node 330. In some embodiments, a mapper is configured to utilize a rule engine to match a first entity to a second entity and generate therefrom an uber node.

For example, in an embodiment, a first entity 310 is matched to a second entity 320 based on a rule stipulating that a value of the data field 'Name' from a first source should match a value of the data field 'ID' of a second source. In some embodiments, a plurality of values from a first source are matched to a plurality of values from a second source, in determining that a first entity matches a second entity. For example, in an embodiment a plurality of values correspond to a unique identifier (e.g., 'name', 'ID', and the like) coupled with an IP address.

In certain embodiments, the data fields of the uber node 320 are tokenized, and a mapping is stored between data fields of various data sources to data fields of the uber node 320. By tokenizing only the shared data model (e.g., the uber node 320 data fields) the required tokenization is a representation having a smaller size than tokenizing each data field of each data source.

Likewise, when generating an output, the output is generated based on the tokenized shared data model, and a query can be generated for each individual data source based on the mapping from the uber node 320 data field to a source data field of the individual data source.

Figure 4:
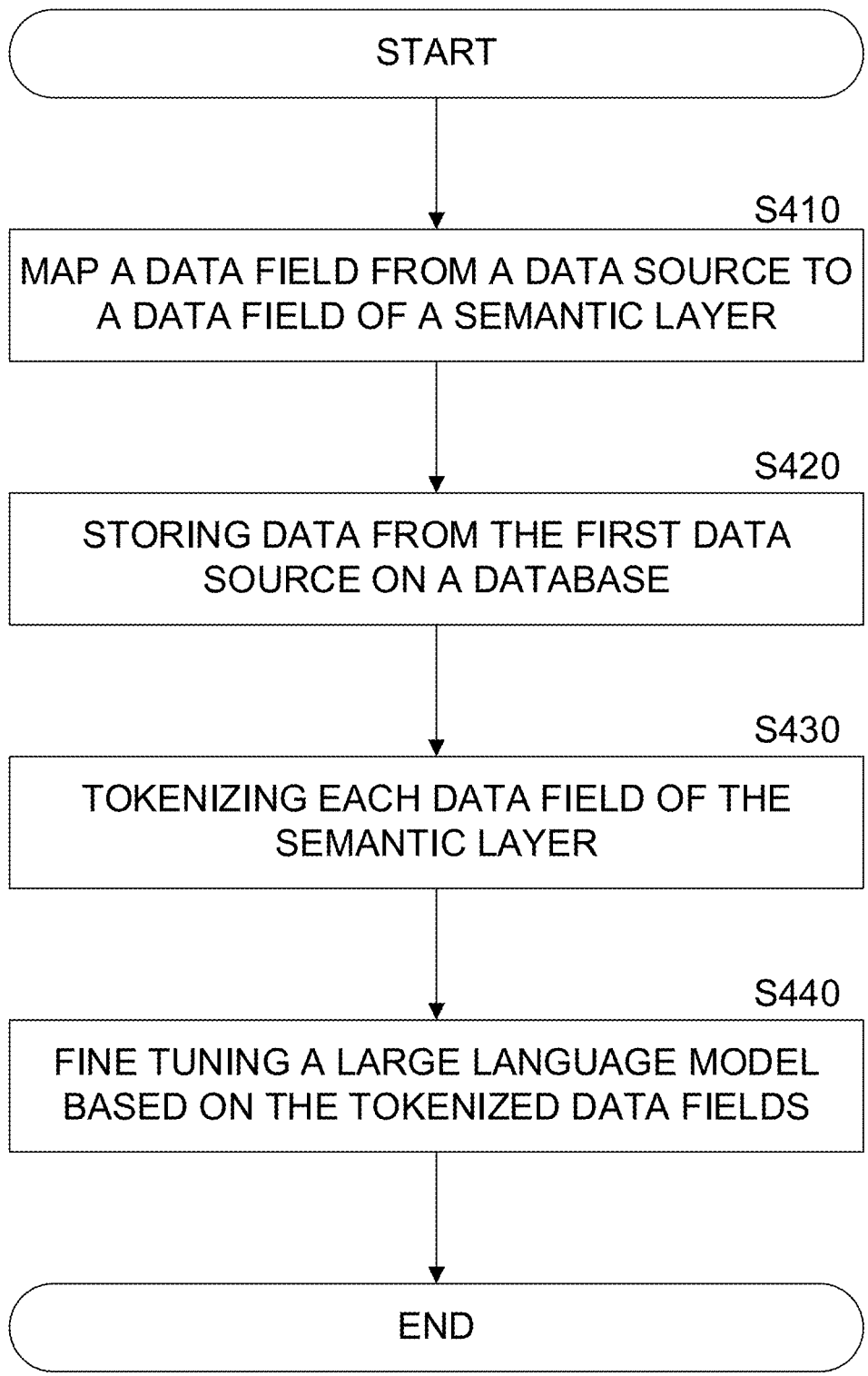
FIG. 4 is an example flowchart of a method for adapting a large language model (LLM) to generate responses based on multiple data sources, utilized to describe an embodiment.

FIG. 4 is an example flowchart of a method for adapting a large language model (LLM) to generate responses based on multiple data sources, utilized to describe an embodiment.

At S410, a data field is mapped from a data source to a semantic layer. In an embodiment, the semantic layer is a shared data model. In certain embodiments, a data field of a data source is mapped to a data field of an uber node. In some embodiments, the semantic layer includes a plurality of uber nodes. In an embodiment, populated uber nodes are stored in a graph database as a representation graph. In certain embodiments, the representation graph represents a computing environment which is connected to the data source.

In an embodiment, the data field is mapped from the data source to the semantic layer by a mapping system, such as the mapping system 170 of FIG. 1 above. In some embodiments, mapping is performed based on natural language processing techniques. For example, according to an embodiment, metadata of a first data field of a data source is utilized in generating a first vector, for example using Word2Vec. In an embodiment, metadata of a first data field of an uber node is utilized to generate a second vector, and a distance is determined between the first vector and the second vector.

In some embodiments, where the distance between the first vector and the second vector is at a threshold, below a threshold, and the like, the first vector and the second vector are determined to be similar, i.e., the first data field of the data source and the first data field of the uber node are matching data fields, such that the first data field of the data source is mapped to the first data field of the uber node.

At S420, data from a data source is stored in a database. In an embodiment, data from a first data source and data from a second data source are both stored in the database based on a data structure defined by an uber node, such as discussed in more detail with respect to FIG. 3 above.

In some embodiments, storing data from the data source further includes resolving a data conflict. For example, according to an embodiment, a data value from a first field conflicts (i.e., does not match) with a data value of a second field, wherein the first field is received from a first data source, and the second field is received from a second data source.

In an embodiment, each data source further includes an authority score. In some embodiments, each data source includes a plurality of authority scores, each authority score assigned to a data field, a plurality of data fields, and the like. In certain embodiments, a data conflict is resolved based on the authority score assigned to each data source, each data field, a combination thereof, and the like. For example, where a first data source has an authority score which is higher than an authority score of a second data source, the data received from the first data source is stored in the uber node.

At S430, a data field is tokenized. In an embodiment, the data field is a data field of the semantic layer, a shared data model, and the like. In some embodiments, the data field is a data field of an uber node.

In certain embodiments, tokenizing a data field includes generating a unique representation such that a unique data field is represented by a unique token. In an embodiment, tokenizing a data field is performed using byte pair encoding.

In some embodiments, a data field is tokenized to a single token, a plurality of tokens, and the like. In an embodiment, a data field from a first resource and a data field from a second resource are mapped to a data field of an uber node, and the data field of the uber node is tokenized.

In certain embodiments, the token, tokens, and the like, associated with the data field of the uber node are utilized to tokenize the data field of the first resource and the data field of the second resource, such that each of the referenced data fields all utilize the same tokenization, thereby decreasing the need to tokenize each of the data fields individually. This saves processing, as less input is needed to be processed, and saves computer memory and storage, as a smaller representation can be utilized.

At S440, the LLM is fine-tuned. In an embodiment, the LLM is fine tuned by freezing weights to some current values, for a portion of neurons in a portion of the layers of the LLM. In certain embodiments, a second portion of neurons in a second portion of layers remain unfrozen, and therefore the weight values are changed by providing training data.

In an embodiment, training can be supervised training, unsupervised training, weak supervised training, reinforced training, a combination thereof, and the like. In certain embodiments, the In some embodiments, when an LLM is fine-tuned, the LLM is provided with an input prompt which is processed to generate an output answer, such as described in more detail with respect to FIG. 2 above.

Figure 5:
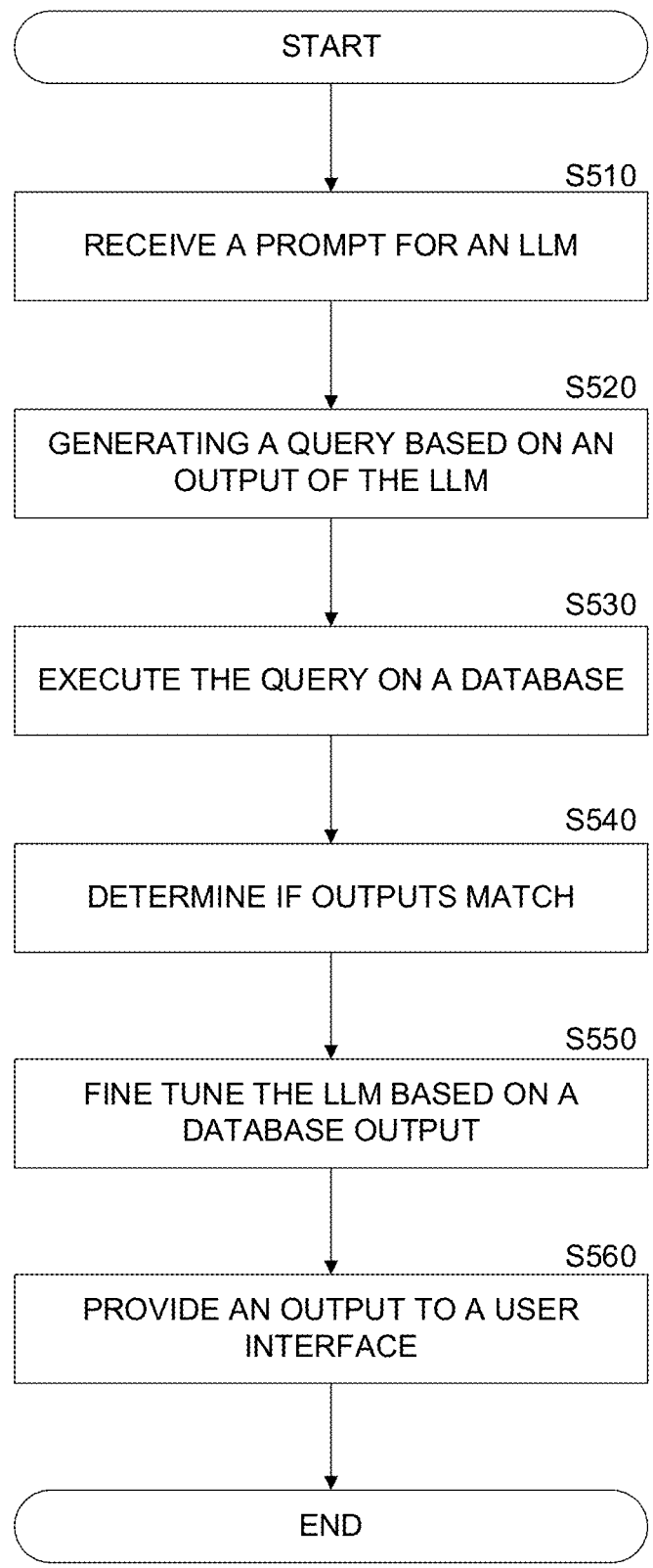
FIG. 5 is an example flowchart of a method for reducing false responses from a large language model (LLM), implemented in accordance with an embodiment.

FIG. 5 is an example flowchart of a method for reducing false responses from a large language model (LLM), implemented in accordance with an embodiment. A false response, also called a hallucination, is a response output which is generated by an LLM based on a received prompt, however the output has no basis in reality.

For example, when asked to provide relevant case law based on certain parameters, a chatbot using a GPT-3 model from OpenAIR provided court dockets which appeared on the surface to be plausible, however no such cases exist in reality.

At S510, an input is received. In an embodiment, the input is received in natural language as a prompt for an LLM. In some embodiments, the input is tokenized, and the tokens are processed by the LLM. In certain embodiments, input is mapped to terms from a shared data model.

In an embodiment, the LLM is a first LLM which is fine-tuned based on a shared data model, semantic layer, and the like. In some embodiments, the first LLM is further fine-tuned based on a plurality of data sources, such as the data sources described in more detail in FIG. 1 above.

In certain embodiments, the LLM is configured to generate an output based on the received input. For example, in an embodiment, the LLM is configured to generate a tokenized output, which is then converted to an output answer.

At S520, a query is generated. In an embodiment, the query is generated based on an output of the LLM. For example, according to an embodiment, the query is generated by providing a second LLM with the output of a first LLM. In some embodiments, the query is generated by further providing the second LLM with a prompt template, wherein the prompt template is modified based on the output of the first LLM.

For example, according to an embodiment, the output of the first LLM is "Product 'x' has feature 'y' and there are currently 'n' products in stock". In an embodiment, a template is "generate a query for database 'z' to detect", which is modified to "generate a query for 'product' database to detect product 'x' having feature 'y'". Such an example is discussed in more detail below with respect to FIGS. 7 and 8.

At S530, the query is executed on a database. In an embodiment, the query is a structured query, an unstructured query, a SQL query, a non-SQL query, a query directed at a columnar database, a query directed at a graph database, a combination of queries directed at different data sources, a combination of queries directed at different database types, a combination thereof, and the like.

In an embodiment, executing the query on a database returns a result. In some embodiments, the result is a text value, a numerical value, alphanumerical value, a combination thereof, and the like. In certain embodiments, executing the query on the database returns a null result, indicating that no data in the database matches the parameters specified by the query.

In some embodiments, a plurality of queries are generated, each query executed on a different database. In certain embodiments, executing each query results in generating an intermediate result, and a total result is generated based on a plurality of intermediate results, each intermediate result corresponding to a different query executed on a database, a plurality of databases, and the like.

At optional S540, outputs are determined to match. In an embodiment, determining that outputs match include matching an output of the first LLM to an output generated by executing a query on a database, wherein the query is generated based on the output of the first LLM. In certain embodiments, a match is determined to occur when a value of the LLM output is equal to a value of the database output. In some embodiments, the match is determined to occur when the value of the LLM output matches the value of the database output, for example within a predetermined percentage (e.g., within 5%).

In other embodiments, a match is determined to occur where a first textual output (from a first LLM) is mapped to a first vector, and a second textual output (from a database result) is mapped to a second vector, and the determined distance between the first vector and the second vector is within a predefined threshold. For example, Word2Vec is utilized, according to an embodiment, to map a text result to a vector form, and a distance is determined between two such converted vectors.

At S550, the LLM is fine-tuned based on the database output. In some embodiments, whether a match does or does not occur, the LLM is further fine-tuned based on the query and the database output (i.e., the database result), as a form of reinforced supervised learning. In certain embodiments, the LLM is fine-tuned with the query and the database output only when a match is determined to occur, or only when a match is determined to not occur.

In some embodiments, a first LLM is fine-tuned based on the query and the database output, the second LLM is fine-tuned based on the query and the database output, a plurality of LLMs are fine-tuned based on the query and the database output, and the like.

At S560, an output is provided. In some embodiments, the output is provided to a user interface. In certain embodiments, where the output of the LLM is determined to match the output of the query, the output of the LLM is provided to the user interface. In some embodiments, the output further includes an authority score, based on an authority score associated with a data source on which the LLM is fine-tuned.

In certain embodiments, the output further includes a credibility score, which is generated based on a plurality of authority scores. In an embodiment, the credibility score is a composite score, generated based on values of a plurality of authority scores, each authority score associated with a unique data source.

In some embodiments, where the authority score, the credibility score, and the like, are below a predetermined threshold, the output further includes an indicator in the user interface, to indicate that the information presented may not be reliable.

In certain embodiments, where the output of the LLM does not match the output of the query, the output to the user interface includes the output of the LLM, the output of the query, the query, a combination thereof, and the like. In such embodiments, the output to the user interface further includes an indicator, a disclaimer, and the like, to indicate that there is a mismatch between the output of the LLM and the output generated by executing the query.

Figure 6:
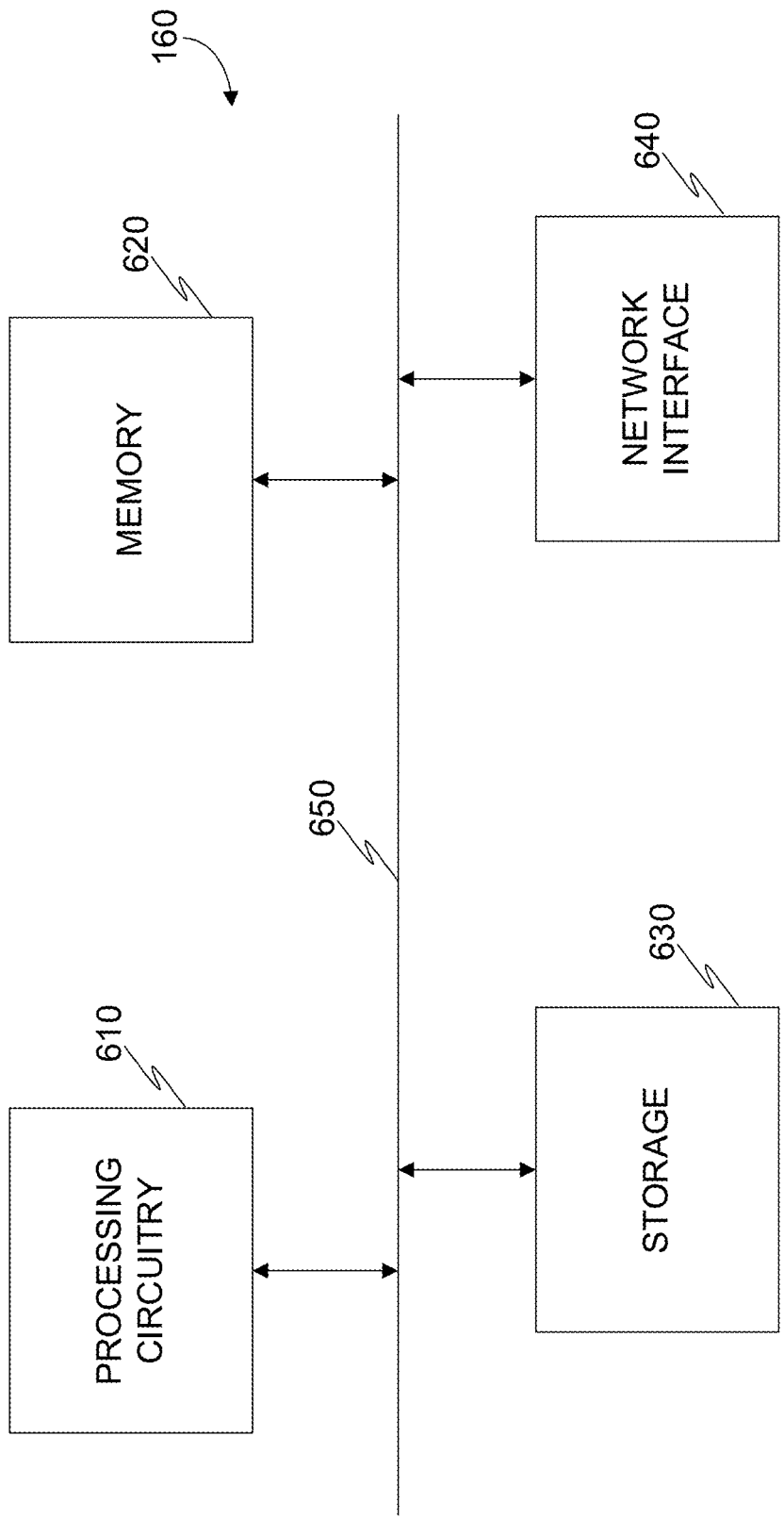
FIG. 6 is an example schematic diagram of a large language model (LLM) system according to an embodiment.

FIG. 6 is an example schematic diagram of a large language model (LLM) system 160 according to an embodiment. The LLM system 160 includes a processing circuitry 610 coupled to a memory 620, a storage 630, and a network interface 640. In an embodiment, the components of the LLM system 160 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof. In an embodiment, the memory 620 is an on-chip memory, an off-chip memory, a combination thereof, and the like. In certain embodiments, the memory 620 is a scratch-pad memory for the processing circuitry 610.

In one configuration, software for implementing one or more embodiments disclosed herein may be stored in the storage 630, in the memory 620, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 640 is configured to provide the LLM system 160 with communication with, for example, the database 150, the mapping system 170, the cybersecurity monitoring solution 110, the SaaS provider 120, the ticketing system 130, and the like.

It should be understood that the embodiments described herein are not limited to the specific architecture illustrated in FIG. 6, and other architectures may be equally used without departing from the scope of the disclosed embodiments.

Furthermore, in certain embodiments the mapping system 170, the database 150, and the like, may be implemented with the architecture illustrated in FIG. 6. In other embodiments, other architectures may be equally used without departing from the scope of the disclosed embodiments.

Figure 7:
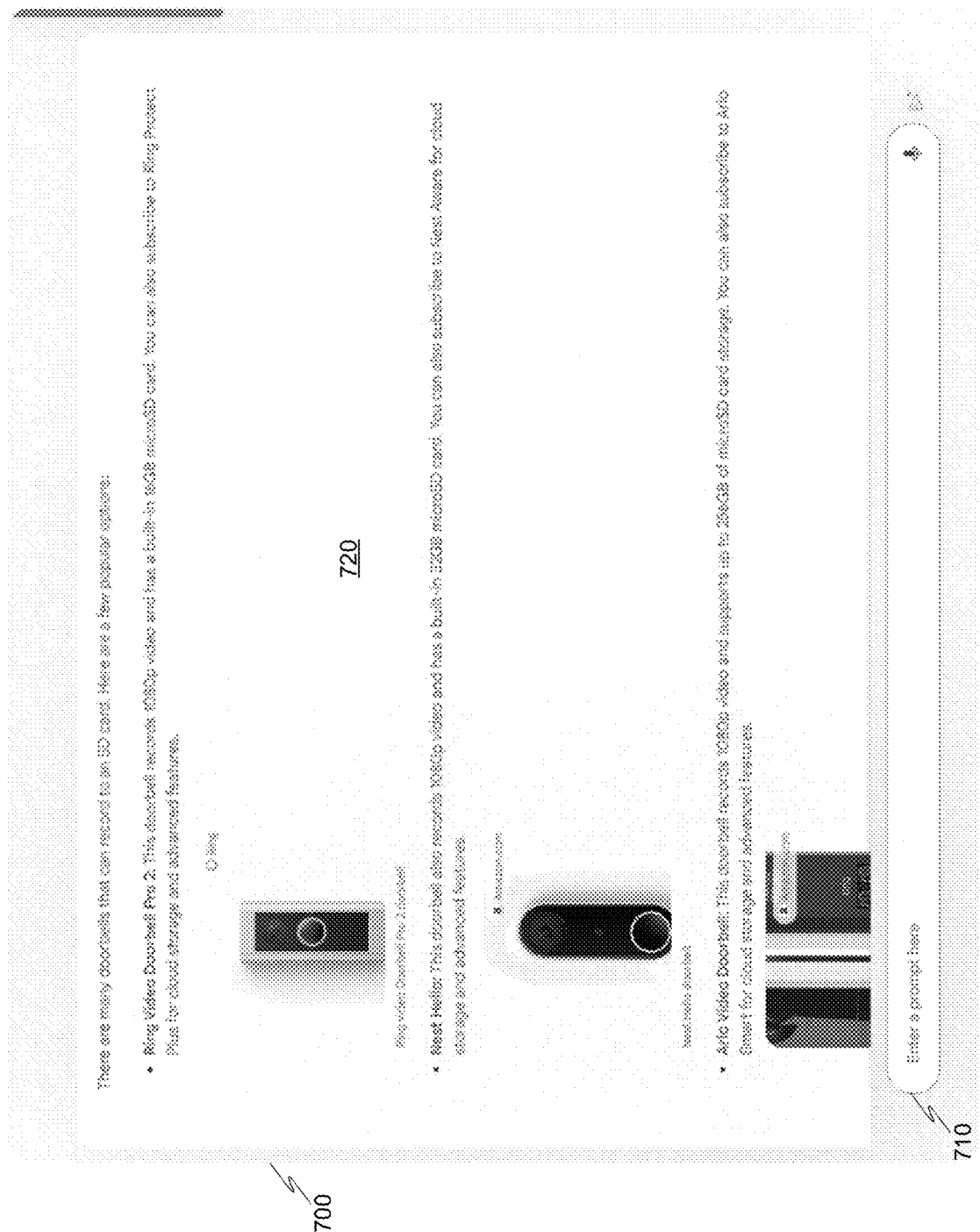
FIG. 7 is an example user interface (UI) for performing I/O operations with an LLM system, utilized to describe an embodiment.

FIG. 7 is an example user interface (UI) 700 for performing I/O operations with an LLM system, utilized to describe an embodiment. In an embodiment, the UI 700 includes an input prompt 710, and an output display 720. In this example, an LLM system was provided with a query to determine what smart electronic doorbells have a capability to record to a secure digital (SD) card.

The LLM system generated an output rendered on the output display 720, which includes images, text, links, and the like. The output generated by the LLM system includes, for example, a text indicating that a certain model of doorbell has a "built-in 16 GB microSD card". If this is a true statement, such a product would indeed satisfy the user. However, such a product does not in fact exist, and the specific model does not have the capability which the LLM stated that it does.

Figure 8:
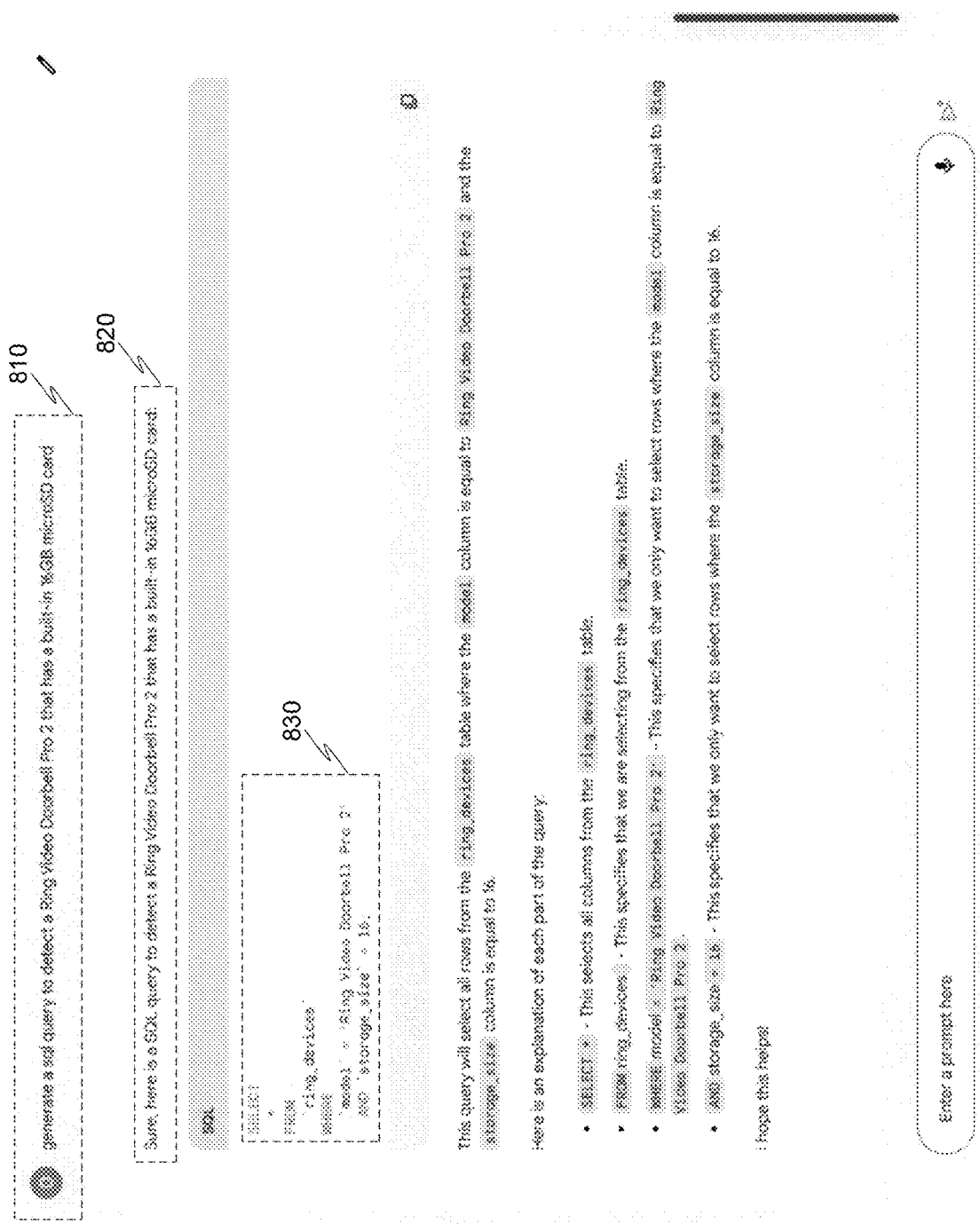
FIG. 8 is an example interface for validating LLM statements, utilized to describe an embodiment.

FIG. 8 is an example interface for validating LLM statements, utilized to describe an embodiment. Based on the output of the LLM system described in more detail in FIG. 7, a query template is modified to generate a query 810. For example, the query template is "generate a sql query to detect"+PRODUCT+ "that has"+FEATURE, where the terms "PRODUCT" and "FEATURE" are terms having values which are extracted from the output generated by the LLM system.

In an embodiment, the LLM system, a second LLM system, and the like, are configured to generate a response 820. In certain embodiments, the response includes an executable query 830, which can be executed on a product database, and determine if such a product does indeed exist. Where such a product does not exist, the output of the first LLM is considered a false output. By providing users outputs with answers which are verified, trust in the LLM system increases, thereby increasing the usability of such systems.

Furthermore, by detecting false outputs, true outputs, and the like, an LLM is further fine-tuned, according to an embodiment, thereby increasing the accuracy of future outputs, by providing reinforced supervised learning.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for reducing false responses from a large language model, comprising:
    mapping a data field from a first source to a data field of a predefined semantic layer, the predefined semantic layer including a plurality of data fields;
    storing data from the first source in a database based on the predefined semantic layer;
    tokenizing each data field of the plurality of data fields for a first large language model (LLM);
    fine-tuning the first LLM based on the tokenized predefined semantic layer;
    providing a prompt to the first LLM, which configures the first LLM to generate an output answer;
    providing the output answer to a second LLM, which configures the second LLM to generate a query for the database;
    executing the query on the database to generate a database output based on the stored data;
    providing the output answer in a user interface (UI) in response to determining that the database output and the output answer are within a predefined threshold; and
    fine-tuning the first LLM further, in response to determining that the database output and the output answer are not within the predefined threshold.

2. The method of claim 1, further comprising:
    fine-tuning the second LLM based on the semantic layer and a plurality of queries, each query of the plurality of queries including a data field of the plurality of data fields.

3. The method of claim 1, further comprising:
    receiving data of a first computing environment associated with a first tenant from the first source;
    receiving data of a second computing environment associated with a second tenant;
    generating a representation of the first computing environment in a representation graph stored on a graph database, based on the received data and the semantic layer;
    generating a representation in the representation graph of the second computing environment;
    receiving a prompt, the prompt including an identifier of a computing environment;
    generating a tokenized input based on the prompt;
    providing the tokenized input to the first LLM, the first LLM further fine-tuned on the representation graph; and
    generating the output answer based on the tokenized input and the identifier of the computing environment.

4. The method of claim 3, further comprising:
    detecting a sensitive data in the prompt, the sensitive data having a classification; and
    generating a new prompt based on the received prompt, wherein the new prompt includes an anonymized data in place of the sensitive data, the anonymized data generated based on the classification.

5. The method of claim 4, further comprising:
    generating the tokenized input based on the new prompt.

6. The method of claim 1, wherein the second LLM is the first LLM.

7. The method of claim 1, further comprising:
    generating a tokenized input based on the prompt; and
    configuring the first LLM to process the tokenized input.

8. The method of claim 1, further comprising:
    generating a second prompt for the second LLM, wherein the second prompt includes a request to generate a query for the database based on the output answer.

9. The method of claim 8, further comprising:
    tokenizing the second prompt; and
    configuring the second LLM to process the tokenized second prompt.

10. The method of claim 1, further comprising:
    providing the output answer further based on a credibility score, wherein the first source is associated with an authority score.

11. The method of claim 10, wherein a second source is associated with a second authority score, and the credibility score is generated based on the authority score and the second authority score.

12. The method of claim 1, further comprising:
generating an uber node in the semantic layer, the uber node including: a data value from a first data field of the first source, and a second data value from a second data field of a second source.

13. The method of claim 12, wherein the second source is a cybersecurity monitoring solution configured to monitor a computing environment with which the first source interacts.

14. A non-transitory computer-readable medium storing a set of instructions for reducing false responses from a large language model, the set of instructions comprising:
one or more instructions that, when executed by one or more processors of a device, cause the device to:
map a data field from a first source to a data field of a predefined semantic layer, the predefined semantic layer including a plurality of data fields;
store data from the first source in a database based on the predefined semantic layer;
tokenize each data field of the plurality of data fields for a first large language model (LLM);
fine-tune the first LLM based on the tokenized predefined semantic layer;
provide a prompt to the first LLM, which configures the first LLM to generate an output answer;
provide the output answer to a second LLM, which configures the second LLM to generate a query for the database;
execute the query on the database to generate a database output based on the stored data;
provide the output answer in a user interface (UI) in response to determining that the database output and the output answer are within a predefined threshold; and
fine-tune the first LLM further, in response to determining that the database output and the output answer are not within the predefined threshold.

15. A system for reducing false responses from a large language model comprising:
a processing circuitry; and
a memory, the memory containing instructions that, when executed by the processing circuitry, configure the system to:
map a data field from a first source to a data field of a predefined semantic layer, the predefined semantic layer including a plurality of data fields;
store data from the first source in a database based on the predefined semantic layer;
tokenize each data field of the plurality of data fields for a first large language model (LLM);
fine-tune the first LLM based on the tokenized predefined semantic layer;
provide a prompt to the first LLM, which configures the first LLM to generate an output answer;
provide the output answer to a second LLM, which configures the second LLM to generate a query for the database;
execute the query on the database to generate a database output based on the stored data;
provide the output answer in a user interface (UI) in response to determining that the database output and the output answer are within a predefined threshold; and
fine-tune the first LLM further, in response to determining that the database output and the output answer are not within the predefined threshold.

16. The system of claim 15, wherein the memory contains further instructions which when executed by the processing circuitry further configure the system to:
fine-tune the second LLM based on the semantic layer and a plurality of queries, each query of the plurality of queries including a data field of the plurality of data field.

17. The system of claim 15, wherein the memory contains further instructions which when executed by the processing circuitry further configure the system to:
receive data of a first computing environment associated with a first tenant from the first source;
receive data of a second computing environment associated with a second tenant;
generate a representation of the first computing environment in a representation graph stored on a graph database, based on the received data and the semantic layer;
generate a representation in the representation graph of the second computing environment;
receive a prompt, the prompt including an identifier of a computing environment;
generate a tokenized input based on the prompt;
provide the tokenized input to the first LLM, the first LLM further fine-tuned on the representation graph; and
generate the output answer based on the tokenized input and the identifier of the computing environment.

18. The system of claim 17, wherein the memory contains further instructions which when executed by the processing circuitry further configure the system to:
detect a sensitive data in the prompt, the sensitive data having a classification; and
generate a new prompt based on the received prompt, wherein the new prompt includes an anonymized data in place of the sensitive data, the anonymized data generated based on the classification.

19. The system of claim 18, wherein the memory contains further instructions which when executed by the processing circuitry further configure the system to:
generate the tokenized input based on the new prompt.

20. The system of claim 15, wherein the second LLM is the first LLM.

21. The system of claim 15, wherein the memory contains further instructions which when executed by the processing circuitry further configure the system to:
generate a tokenized input based on the prompt; and
configure the first LLM to process the tokenized input.

22. The system of claim 15, wherein the memory contains further instructions which when executed by the processing circuitry further configure the system to:
generate a second prompt for the second LLM, wherein the second prompt includes a request to generate a query for the database based on the output answer.

23. The system of claim 22, wherein the memory contains further instructions which when executed by the processing circuitry further configure the system to:
tokenize the second prompt; and
configure the second LLM to process the tokenized second prompt.

24. The system of claim 15, wherein the memory contains further instructions which when executed by the processing circuitry further configure the system to:
provide the output answer further based on a credibility score, wherein the first source is associated with an authority score.

25. The system of claim 24, wherein a second source is associated with a second authority score, and the credibility score is generated based on the authority score and the second authority score.

26. The system of claim 15, wherein the memory contains further instructions which when executed by the processing circuitry further configure the system to:
  generate an uber node in the semantic layer, the uber node including: a data value from a first data field of the first source, and a second data value from a second data field of a second source.

27. The system of claim 26, wherein the second source is a cybersecurity monitor solution configured to monitor a computing environment with which the first source interact.

* * * * *